United States Patent
Tomioka

(10) Patent No.: US 10,528,304 B2
(45) Date of Patent: Jan. 7, 2020

(54) SERVER FOR PLACING AN ORDER BASED ON IDENTIFICATION INFORMATION FOR IDENTIFYING A SOURCE OR PURCHASE, IMAGE PROCESSING APPARATUS, AND SYSTEM

(71) Applicant: CANON KABUSHIKI KAISHA, Tokyo (JP)

(72) Inventor: Yu Tomioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/896,468

(22) Filed: Feb. 14, 2018

(65) Prior Publication Data

US 2018/0239568 A1      Aug. 23, 2018

(30) Foreign Application Priority Data

Feb. 20, 2017    (JP) ................................. 2017-029402

(51) Int. Cl.
| | | |
|---|---|---|
| G06Q 10/08 | (2012.01) | |
| G06F 3/12 | (2006.01) | |
| G06Q 30/06 | (2012.01) | |

(52) U.S. Cl.
CPC .......... *G06F 3/1231* (2013.01); *G06F 3/1235* (2013.01); *G06F 3/1287* (2013.01);
(Continued)

(58) Field of Classification Search
CPC ..... G06F 3/1231; G06F 3/1235; H04L 43/08; H04L 43/16
(Continued)

(56) References Cited

U.S. PATENT DOCUMENTS

2003/0009383 A1* 1/2003 Mori ....................... G06Q 10/08
705/22
2003/0139973 A1* 7/2003 Claremont ............ G06Q 30/06
705/26.81
(Continued)

FOREIGN PATENT DOCUMENTS

| JP | 11-352846 A | 12/1999 |
|---|---|---|
| JP | 2001297237 A | 10/2001 |

(Continued)

OTHER PUBLICATIONS

Japanese Office Action issued in corresponding Japanese Application No. 2017-029402 dated Nov. 12, 2019.

*Primary Examiner* — Jamares Q Washington
(74) *Attorney, Agent, or Firm* — Venable LLP

(57) ABSTRACT

The server of the present invention includes one or more processors operating to: acquire first identification information to identify an image processing apparatus and second identification information to identify a source of purchase of a consumable item used by the image processing apparatus, which are transmitted from an external device; store the acquired second identification information transmitted from the external device in a storage medium in association with the first identification information; acquire the first identification information transmitted from the image processing apparatus; determine whether the acquired first identification information transmitted from the image processing apparatus is stored in the storage medium; and start a predetermined service to make an order for the consumable item with the source of purchase in a case where the first identification information transmitted from the image processing apparatus is stored in the storage medium.

25 Claims, 13 Drawing Sheets

(52) U.S. Cl.
CPC ......... *G06Q 30/0603* (2013.01); *G06F 3/121* (2013.01); *G06F 3/1229* (2013.01); *G06F 3/1288* (2013.01)

(58) Field of Classification Search
USPC ............ 358/1.15; 709/203, 224; 705/28, 29
See application file for complete search history.

(56) References Cited

U.S. PATENT DOCUMENTS

| | | | | |
|---|---|---|---|---|
| 2008/0126228 | A1* | 5/2008 | Nagai | G06Q 10/00 705/28 |
| 2010/0241484 | A1* | 9/2010 | Nichols | G06Q 10/06311 705/7.13 |
| 2011/0158659 | A1* | 6/2011 | Tarao | G03G 15/5016 399/8 |

FOREIGN PATENT DOCUMENTS

| | | |
|---|---|---|
| JP | 2005-025520 A | 1/2005 |
| JP | 2005-157866 A | 6/2005 |
| JP | 2008-040926 A | 2/2008 |
| JP | 2008310617 A | 12/2008 |

\* cited by examiner

| APPARATUS IDENTIFICATION INFORMATION | SHOP IDENTIFICATION INFORMATION | SHOP NAME | ORDERING URL | STATUS | ADMISSION DATE AND TIME |
|---|---|---|---|---|---|
| printerId_0001 | reatailerId_000a | ELECTRIC APPLIANCE SHOP ○○○ | http://xxx.com/rest/orIder | ADMIT | 20161124150000 |
| printerId_0002 | reatailerId_000b | XXX HOME | http://yyy.com/rest/buyink | SERVICE IN | 20161120100000 |

FIG.6

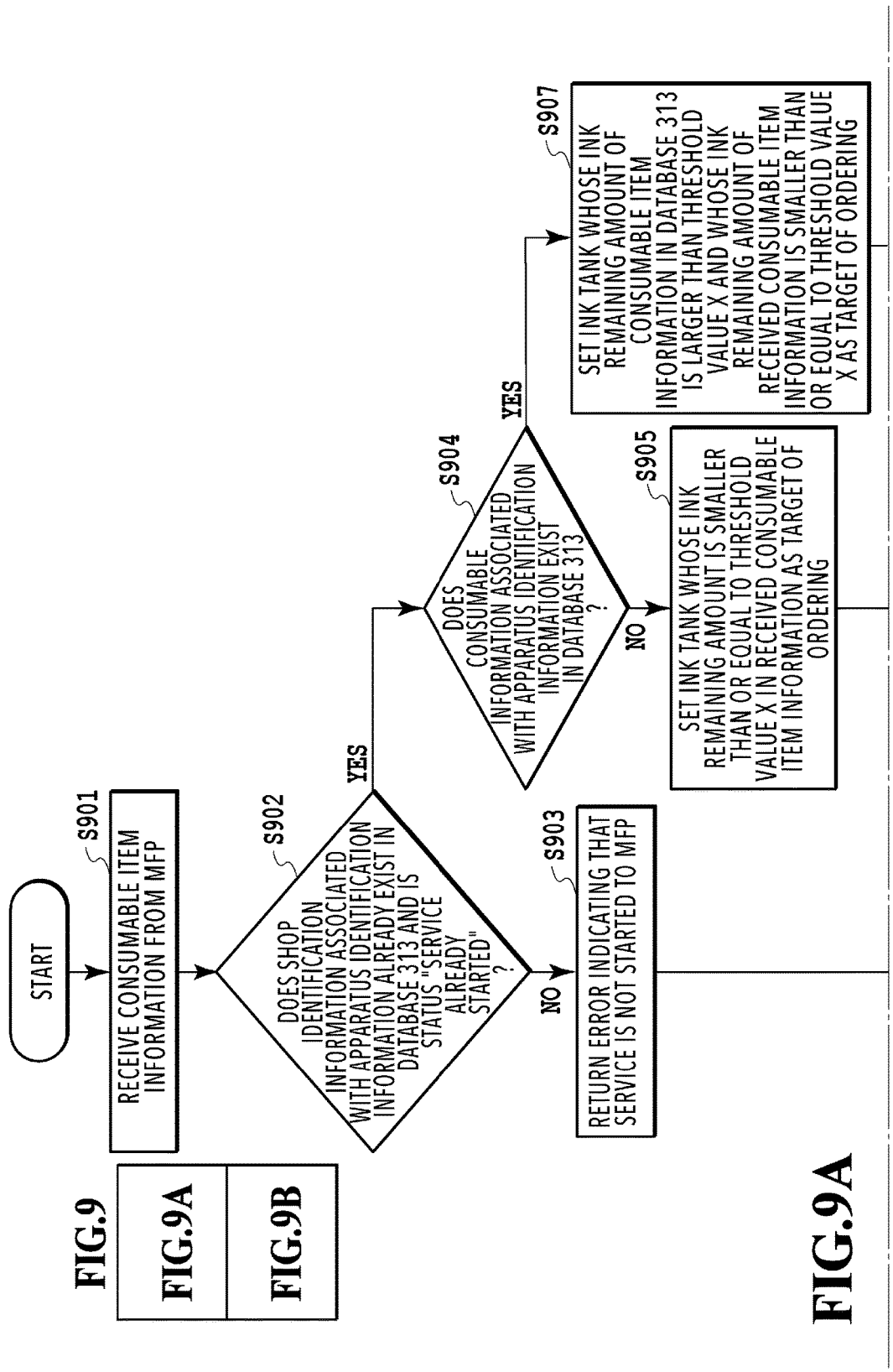

```
{
"ink":[{"color":"C", "remain":"100", "status":"FULL"},
    {"color":"M", "remain":"20", "status":"LOW"},
    {"color":"Y", "remain":"10", "stauts":"EMPTY"},
    {"color":"BK", "remain":"80", "status":"FULL"}],
"paper":[{"size":"A4", "remain":"20", "type":"stationary"},
    {"size":"L", "remain":"2", "type":"photo"}]
}
```

FIG.10

SERVER FOR PLACING AN ORDER BASED ON IDENTIFICATION INFORMATION FOR IDENTIFYING A SOURCE OR PURCHASE, IMAGE PROCESSING APPARATUS, AND SYSTEM

BACKGROUND OF THE INVENTION

Field of the Invention

The present invention relates to a server that makes an order for a consumable item in an image processing apparatus, an image processing apparatus, and a system.

Description of the Related Art

An image processing apparatus represented by a printer, a copy machine, or a facsimile requires consumable items, such as ink and sheets, in the process of its use. In the case where a consumable item necessary for the image processing apparatus runs out or runs short, normally a user goes to a shop and purchases the consumable item.

In recent years, an image processing apparatus that can connect to the Internet has been developed and there is a consumable item ordering system that makes an order for a consumable item with a shop based on information on the consumable item notified by such an image processing apparatus (Japanese Patent Laid-Open No. 2001-297237). This consumable item ordering system has removed a disadvantage that a user needs to go to a shop. However, on the other hand, Japanese Patent Laid-Open No. 2001-297237 has not referred to that a user can arbitrarily set (select) a shop with which an order for a consumable item is made. Consequently, in order to make it possible for a user to arbitrarily set a shop with which an order for a consumable item is made, Japanese Patent Laid-Open No. 2008-310617 has proposed a consumable item ordering system that enables a user to change a shop via an image processing apparatus by causing an ink tank to have information on a shop, which is an order destination.

However, with the consumable item ordering system of Japanese Patent Laid-Open No. 2008-310617, it is necessary to cause an ink tank to have information on the shop, which is the order destination, and therefore, there is such a problem that an increase in the cost of the ink tank will result. Further, there is also such a problem that it is not possible to make an order with a shop for consumable items that cannot have information on the shop, for example, such as a sheet.

The present invention has been developed in view of the above-described conventional problems, and an object is to make it possible to set an order destination without causing a consumable item to have information on the order destination.

SUMMARY OF THE INVENTION

In order to attain the above-described object, the server of the present invention includes one or more processors operating to: acquire first identification information to identify an image processing apparatus and second identification information to identify a source of purchase of a consumable item used by the image processing apparatus, which are transmitted from an external device; store the acquired second identification information transmitted from the external device in a storage medium in association with the first identification information; acquire the first identification information transmitted from the image processing apparatus; determine whether the acquired first identification information transmitted from the image processing apparatus is stored in the storage medium; and start a predetermined service to make an order for the consumable item with the source of purchase in a case where the first identification information transmitted from the image processing apparatus is stored in the storage medium.

Further features of the present invention will become apparent from the following description of exemplary embodiments with reference to the attached drawings.

BRIEF DESCRIPTION OF THE DRAWINGS

FIG. 6 is a diagram showing shop information that is registered in a database;

FIG. 9 is a diagram showing the relationship of FIG. 9A and FIG. 9B;

FIG. 9A is a flowchart showing a flow of consumable item ordering processing;

FIG. 10 is a diagram showing consumable item information;

DESCRIPTION OF THE EMBODIMENTS

In the following, with reference to the attached drawings, preferred embodiments of the present invention are explained in detail.

Figure 1:
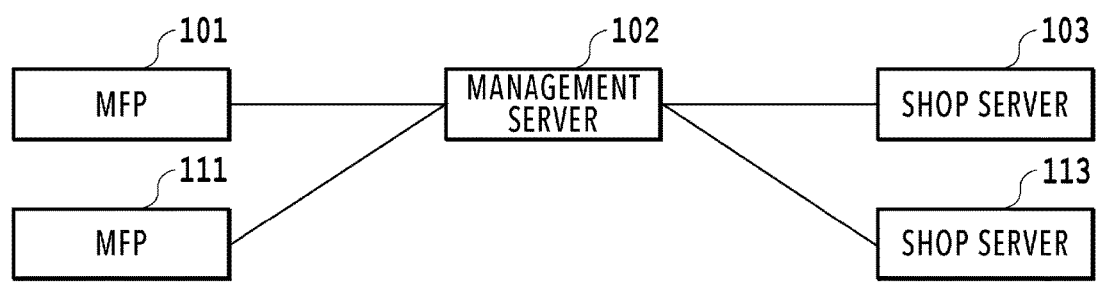
FIG. 1 is a diagram showing a configuration of a consumable item ordering system according to an embodiment of the present invention.

FIG. 1 is a diagram showing a configuration of a consumable item ordering system according to an embodiment of the present invention, also showing, as an example thereof, a client-server network system as a block diagram. In the network system shown in FIG. 1, two multifunction printers (hereinafter referred to as MFPs) 101 and 111 are connected with a management server 102 as an information processing apparatus via a predetermined network, such as the Internet. Further, two shop servers 103 and 113 are connected with the management server 102 via a predetermined network, such as the Internet. The shop servers 103 and 113 are servers possessed by shops (in a wider sense, dealers) but any server (terminal) may be used as long as it is possible to communicate with the management server 102 by HTTPS (Hypertext Transfer Protocol Secure). It is also possible to perform communication directly between the MFP 101 and the management server 102 and between the shop server 103 and the management server 102, or to perform communication indirectly by interposing a PC, a server, and so on therebetween.

Figure 2:
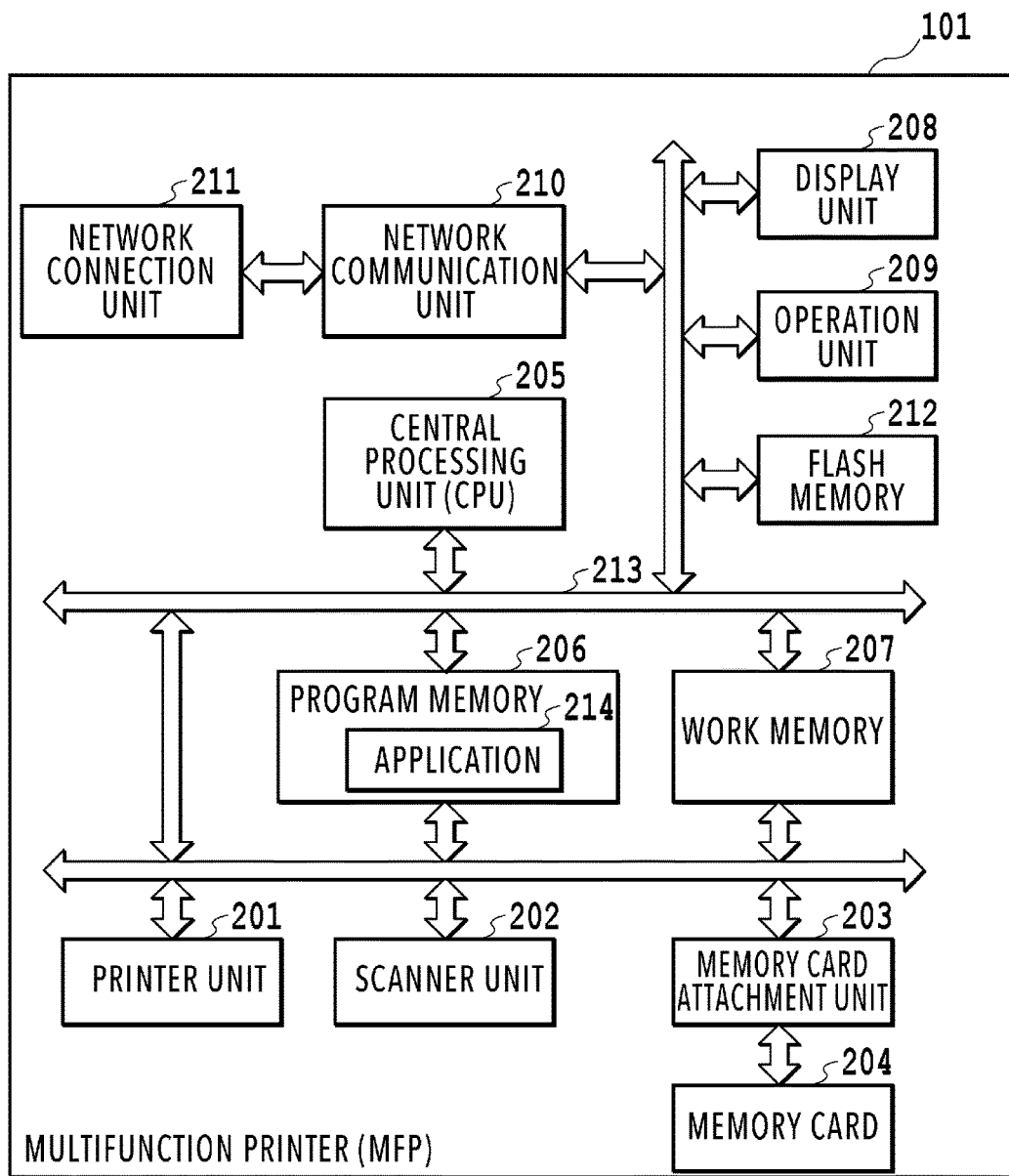
FIG. 2 is a block diagram showing a hardware configuration of an MFP.

FIG. 2 is a block diagram showing a hardware configuration of the multifunction printer (that is, the MFP 101 or 111). In the present specification, as the peripheral device, the MFP is explained exclusively as an example, but the peripheral device may be, for example, an image processing apparatus, a copy machine, a facsimile, and so on.

A printer unit 201 prints image data received from outside, image data stored in a memory card 204, and so on, on a printing sheet by a printing method, such as an ink jet method and an electrophotographic method. Further, the printer unit 201 also manages ink information including an ink remaining amount and sheet information including a number of loaded sheets.

A scanner unit 202 optically reads a document that is set on a document table (not shown schematically) and converts into electronic data and transmits image data further converted into a specified file format to an external device via a network or saves the image data in a saving area (not shown schematically), such as an HDD. The copy service is implemented by the scanner unit 202 reading a document placed on a document table to generate image data and transmitting the image data to the printer unit 201, and by the printer unit 201 printing the image data on a printing sheet.

A memory card attachment unit 203 reads and transfers various kinds of file data stored in the memory card 204. The memory card 204 stores various kinds of file data. It is possible to read and edit the various kinds of file data stored in the memory card 204 from an external device via a network. It is also be possible to store file data in the memory card 204 from an external device.

A CPU 205 is a central processing unit configured to control each unit within the MFPs 101/111. A program memory 206 includes a ROM (Read Only Memory) and the like and stores various program codes and an application 214 to communicate with a server device. The application 214 acquires consumable item information on ink, sheets, and so on, by accessing the printer unit 201. A work memory 207 includes a RAM (Random Access Memory) and the like and temporarily stores image data and the like, performs buffering, and so on, at the time of performing each service.

A display unit 208 includes, for example, an LCD (Liquid Crystal Display) and the like and displays various pieces of information. An operation unit 209 includes a switch and the like for a user to perform various input operations. A network communication unit 210 connects the MFPs 101/111 to a network, such as the Internet, via a network connection unit 211 and performs various kinds of communication. Specifically, the network communication unit 210 transmits ink information, sheet information, and so on, to the management server 102 as consumable item information (that is, the network communication unit 210 corresponds to a consumable item information transmission unit of the present invention).

The network communication unit 210 is compatible with a wired LAN and a wireless LAN and in the case of being wired LAN compatible, the network connection unit 211 is a connector to connect a wired LAN cable and in the case of being wireless LAN compatible, the network connection unit 211 is an antenna. A flash memory 212 is a nonvolatile memory to store image data and the like received by the network communication unit 210. Each unit of the MFPs 101/111 is connected to one another by a bus 213.

Figure 3:
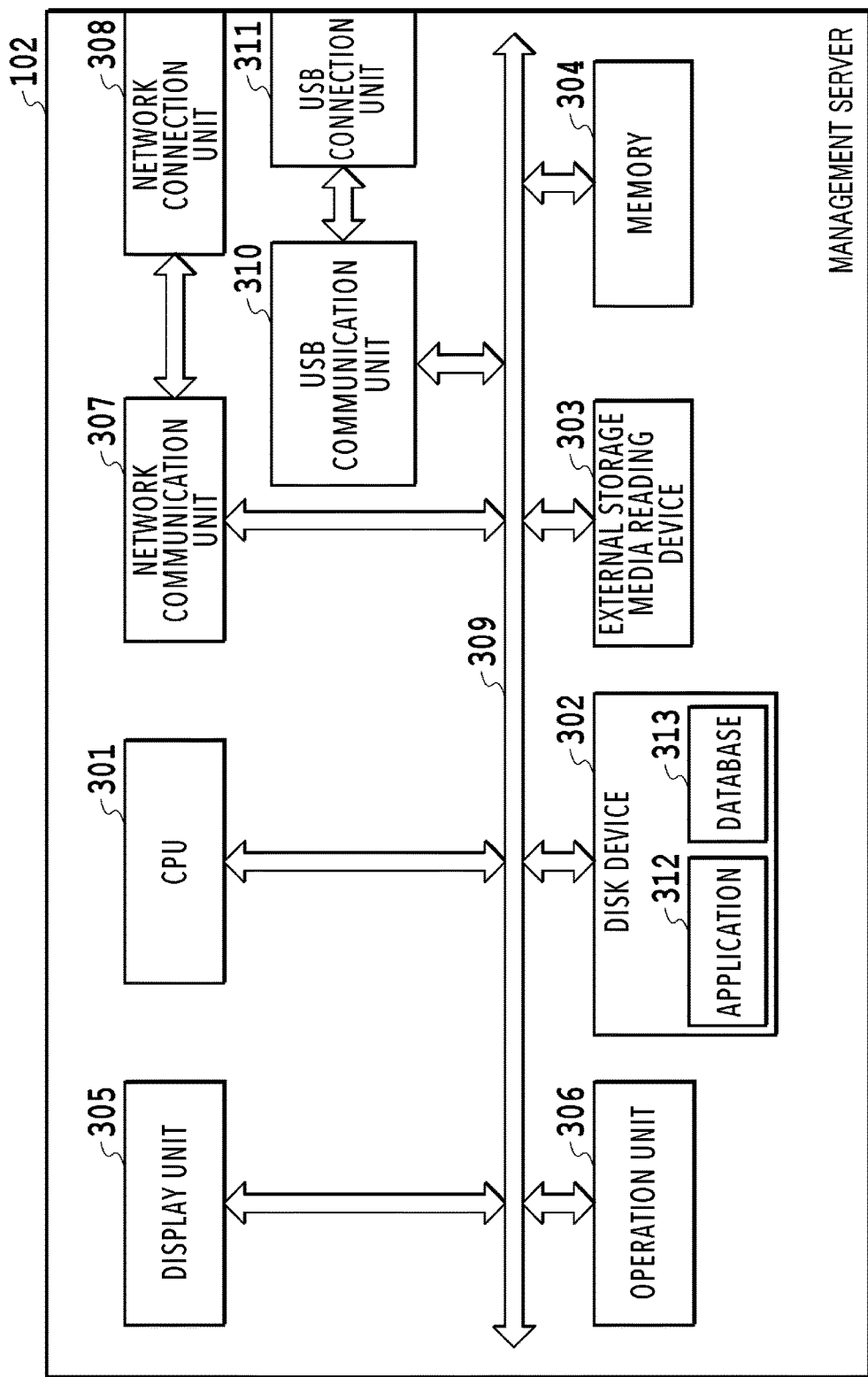
FIG. 3 is a block diagram showing a hardware configuration of a management server.

FIG. 3 is a block diagram showing a hardware configuration of the management server 102. A CPU (Central Processing Unit) 301 is a central processing unit configured to control each unit of the management server 102. A disk device 302 stores various files, in addition to an application 312 that is read by the CPU 301, a database 313, and an OS (Operating System). An external storage media reading device 303 is a device to read information on a file stored in an external storage medium, such as an SD card. A memory 304 includes a RAM (Random Access Memory) and the like and the CPU 301 temporarily stores data, performs buffering, and so on, as needed.

A display unit 305 includes, for example, an LCD and the like and displays various pieces of information. An operation unit 306 includes a keyboard, a mouse, and so on, for a user to perform various input operations. A network communication unit 307 is connected to a network, such as the Internet, via a network connection unit 308 and performs various kinds of communication. The network communication unit 307 is compatible with a wired LAN and a wireless LAN. In the case of being wired LAN compatible, the network connection unit 308 is a connector to connect a wired LAN cable and in the case of being wireless LAN compatible, the network connection unit 308 is an antenna. A USB (Universal Serial Bus) communication unit 310 is connected with various peripheral devices via a USB connection unit 311 and performs various kinds of communication. Each unit of the management server 102 is connected to one another by a bus 309.

Figure 4:
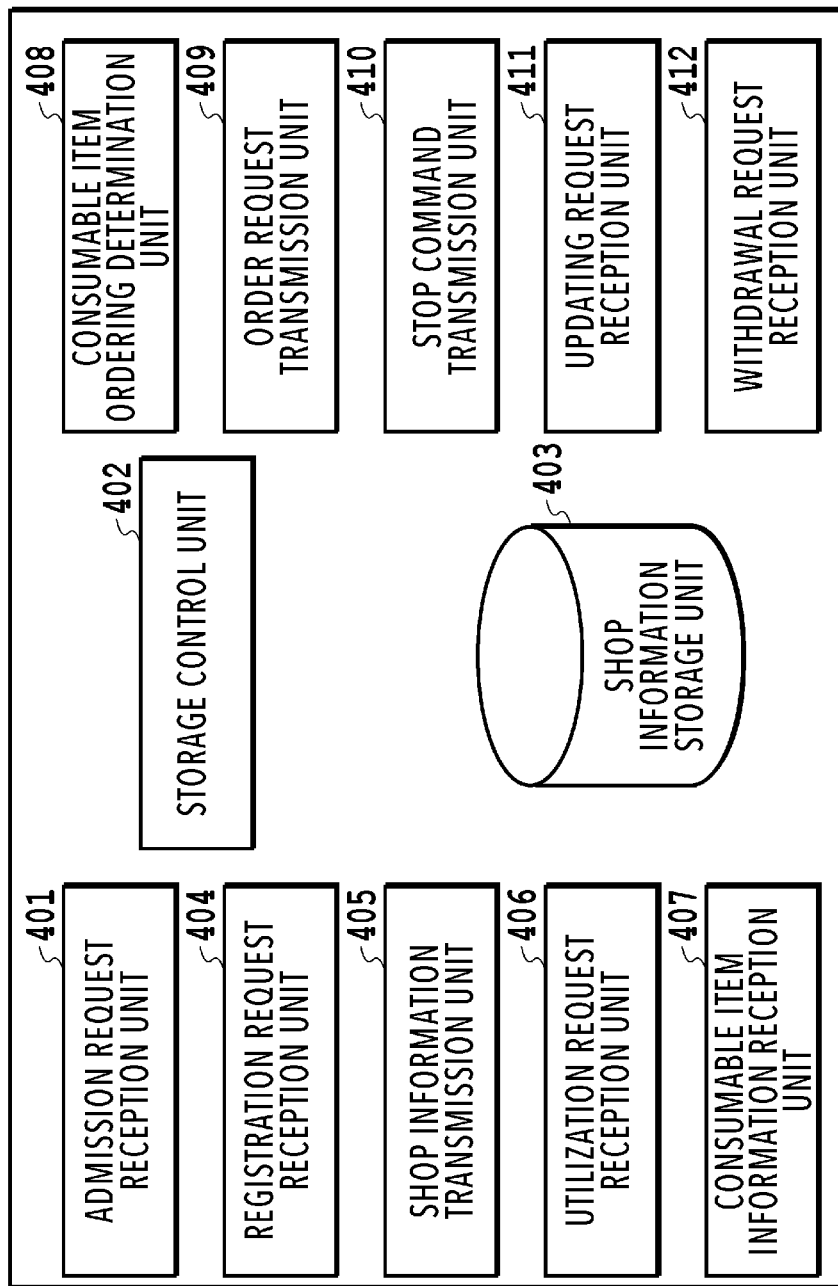
FIG. 4 is a block diagram showing a function configuration of the management server.

FIG. 4 is a block diagram showing a function configuration of the management server 102. The management server 102 includes various functions shown in FIG. 4. An admission request reception unit 401 receives an admission request transmitted from the shop server 103 of a shop for which an admission procedure has been performed by a user, as will be described later in FIG. 5. The admission request is received in association with Apparatus identification information 601 and Shop identification information 602 shown in FIG. 6, to be described later. A storage control unit 402 performs control so that information received by each reception unit (for example, the admission request reception unit 401 and the like described previously) is stored (or updated) in a shop information storage unit 403. The shop information storage unit 403 corresponds to a branch information storage unit of the present invention and is the database 313.

A registration request reception unit 404 receives a registration request transmitted from the MFP 101 by, for example, a user pressing down a registration button (811 in FIG. 8A, to be described later) of the MFP 101 after setting up the MFP 101, as will be described later in FIG. 7. The registration request is received in association with Apparatus identification information 601 so that the MFP 101 can be identified. A shop information transmission unit 405 corresponds to a branch information transmission unit of the present invention and upon receipt of a registration request transmitted from the MFP 101, the shop information transmission unit 405 transmits shop information to the MFP 101 as its response. The shop information transmitted to the MFP 101 is displayed on a UI 840 of the MFP 101 as information to check the start of the service at the shop as shown in FIG. 8D, to be described later.

A utilization request reception unit 406 receives a utilization request for the consumable item ordering service, which is transmitted from the MFP 101. The utilization request reception unit 406 corresponds to an execution request reception unit of the present invention and in the case where the utilization request reception unit 406 receives a utilization request (that is, an execution request) for the consumable item ordering service, determination processing to determine whether or not to make an order for a consumable item is performed by a consumable item ordering determination unit 408, to be described later. Due to this, the consumable item ordering service is started.

A consumable item information reception unit 407 corresponds to an acquisition unit of the present invention and receives consumable item information on ink, sheets, and so on, from the MFP 101 at predetermined time intervals or in the case where the remaining amount value of a consumable item changes. The consumable item information is received in association with Apparatus identification information 601. The consumable item ordering determination unit 408 corresponds to an ordering determination unit of the present invention and determines whether or not to make an order for a consumable item with a shop based on the remaining amount value of the consumable item information received by the consumable item information reception unit 407.

An order request transmission unit 409 transmits an order request for a consumable item to a shop in the case where the consumable item ordering determination unit 408 determines to make an order for the consumable item. In the case where it is determined that Shop identification information 602 associated with Apparatus identification information 601 received by the consumable item information reception unit 407 is not stored in the shop information storage unit 403, a stop command transmission unit 410 commands the MFP 101 to stop transmission of consumable item information. That is, the stop command transmission unit 410 transmits a transmission stop command to the MFP 101.

An updating request reception unit 411 receives an updating request that is transmitted from the shop server 103 of a shop. In an updating request, updating information in relation to a shop is included and further, updating information is received in association with Apparatus identification information 601 and Shop identification information 602 so as to identify a branch. A withdrawal request reception unit 412 receives a withdrawal request that is transmitted from the shop server 103 of a shop for which a withdrawal procedure has been performed by a user. A withdrawal request is received in association with Apparatus identification information 601 and Shop identification information 602.

Figure 5:
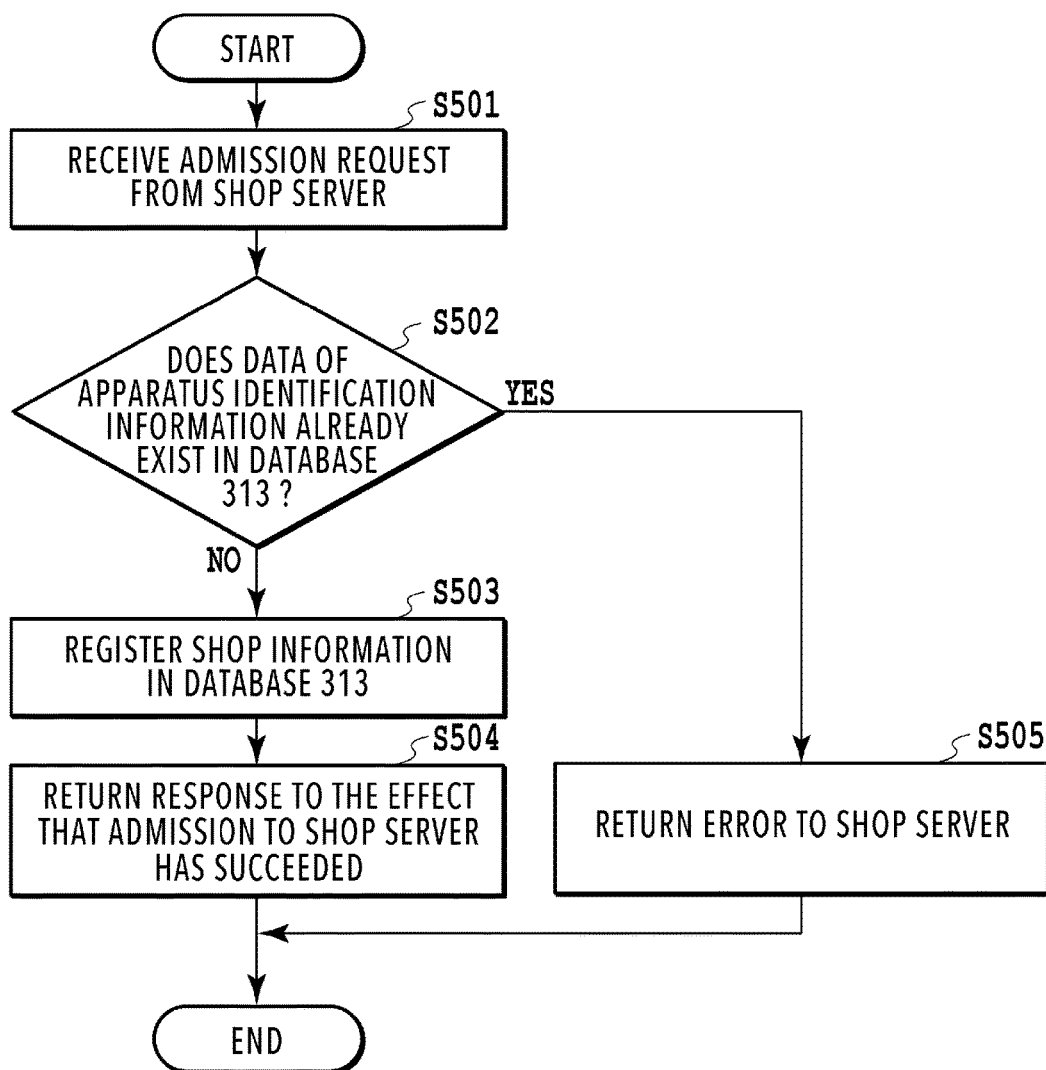
FIG. 5 is a flowchart showing a flow of admission processing.

In the following, processing necessary to start the consumable item ordering service in the consumable item ordering system shown in FIG. 1 is explained by using FIG. 5 and FIG. 7. FIG. 5 is a flowchart showing a flow of admission processing in the management server 102. The processing shown in FIG. 5 is implemented by the CPU 301 loading the application 312 stored in the disk device 302 onto the memory 304 and executing the application 312.

In the case where a user purchases the MFP 101 at a shop, at the same time, the user performs an application procedure to enter the consumable item ordering service. In the case where an application procedure is performed by the user, the shop reads apparatus identification information on the MFP 101, which is described on a packaging box and the like of the MFP 101, by a POS terminal and the like and inputs the information to the shop server 103. After this, the shop server 103 transmits an admission request to the management server 102.

At step S501, the management server 102 receives an admission request from the shop server 103. Here, the management server 102 receives from the shop server 103, as shop information, apparatus identification information to identify the MFP 101, shop identification information to identify the shop, the shop name of the shop, an ordering URL that is used at the time of making an order for a consumable item with the shop, and so on. As information in relation to the shop, it is also possible to include other pieces of information, such as an icon image of the shop, in addition to the shop name.

At step S502, the management server 102 determines whether or not the received apparatus identification information exists in the database 313. In the case of determining that the received apparatus identification information exists in the database 313 (YES at S502), the management server 102 advances the processing to step S05 and returns an admission error to the shop server 103 (S505). In the case of determining that the received apparatus identification information does not exist in the database 313 (NO at S502), the management server 102 advances the processing to step S03 and registers the shop information in the database 313 (S503). After registering the shop information in the database 313, at step S504, the management server 102 returns a response to the effect that the admission to the shop server 103 has succeeded (S504).

FIG. 6 is a diagram showing shop information that is registered in the database of the management server. That is, in the case where shop information is registered in the database 313 of the management server 102 at step S503 in FIG. 5, the shop information is shown as in FIG. 6. In FIG. 6, Apparatus identification information 601 is information to identify the MFP 101. Shop identification information 602 corresponds to branch identification information of the present invention and is information to identify the shop, indicating the source of purchase of a consumable item. Shop name 603 is information in relation to the name of the shop. As to Shop name 603, it may also be possible to use other pieces of information, such as an icon representing the shop, in addition to the name of the shop.

Ordering URL 604 is a URL to which the management server 102 transmits a request at the time of making an order for a consumable item and is an API (Application Programming Interface) existing on the side of the shop server 103. Status 605 is status information of the present invention, information indicating the state of the MFP 101 on the consumable item ordering system, corresponding to the apparatus identification information.

Upon receipt of a utilization request for the consumable item ordering service, the utilization request reception unit 406 described previously sets Status 605 to "service already started" (that is, whether or not the ordering determination processing of a consumable item is executable in the consumable item ordering determination unit 408 is set to "executable"). Admission date and time 606 is information on the date and time at the time of admission.

Figure 7:
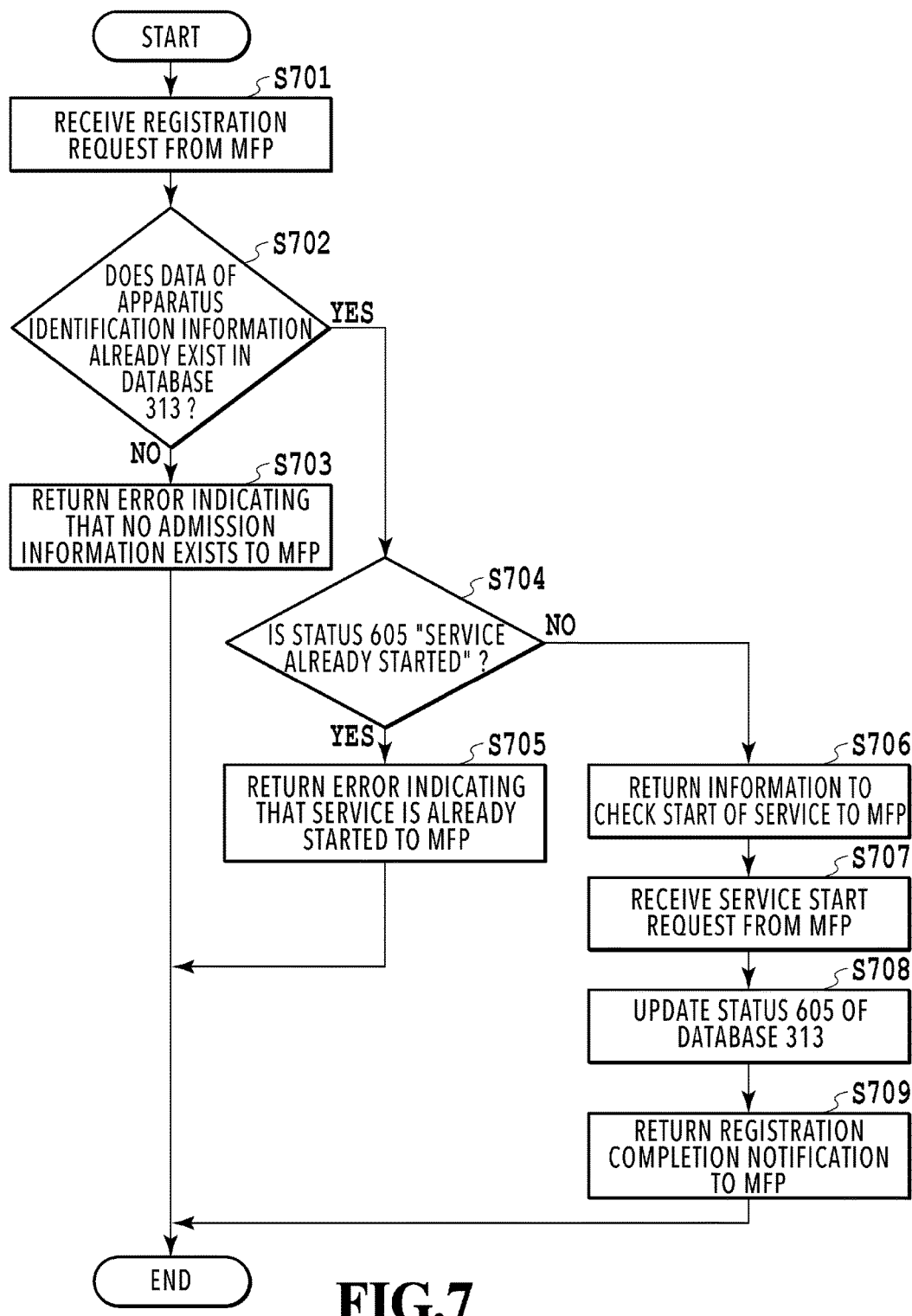
FIG. 7 is a flowchart showing a flow of registration processing.
Figure 8A:
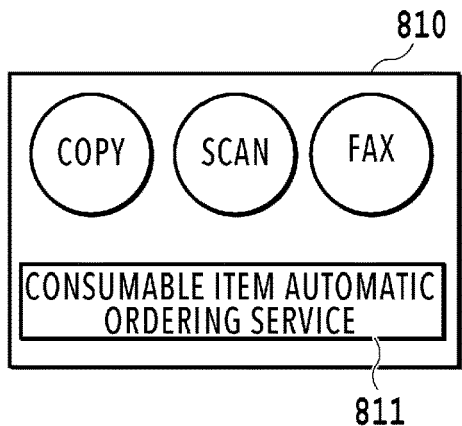
FIGS. 8A to 8E are diagrams showing display examples on a UI of the MFP.

FIG. 7 is a flowchart showing a flow of the registration processing in the management server 102. In the case where a user purchases the MFP 101, the user sets up the MFP 101 in a state of being capable of connecting to the Internet. In the case where the power source of the MFP 101 is turned on by the user, on the display unit 208 of the MFP 101, a UI (User Interface) 810 including a registration button 811 to register in the consumable item ordering system, which is shown in FIG. 8A, is displayed. In the case where the user presses down the registration button 811 on the UI 810, the MFP 101 transmits a registration request to the management server 102.

At step S701, the management server 102 receives a registration request from the MFP 101. The management server 102 also receives the apparatus identification information on the MFP 101 from the MFP 101 at the same time. At step S702, the management server 102 checks whether or not the shop identification information associated with the apparatus identification information received at step S701 exists in the database 313.

Figure 8B:
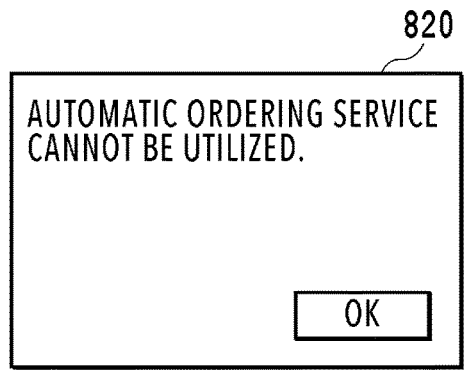

In the case where the shop identification information associated with the apparatus identification information does not exist in the database 313 (NO at step S702), the management server 102 advances the processing to step S703 and returns an error indicating that no admission information exists to the MFP 101 (S703). Upon receipt of the error indicating that no admission information exists, the MFP 101 displays a UI 820 shown in FIG. 8B.

In the case where the shop identification information associated with the apparatus identification information exists in the database 313 (YES at S702), the management server 102 advances the processing to step S704. At step 704, the management server 102 determines whether or not Status 605 of the shop information acquired from the database 313 by using the apparatus identification information received at step S701 is "service already started" (S704).

Figure 8C:
Figure 8D:
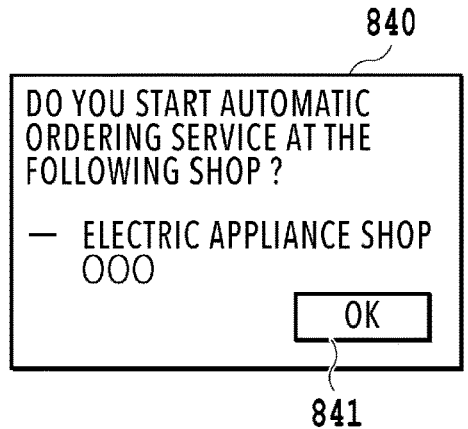

In the case where Status 605 is "service already started" (YES at S704), the management server 102 advances the processing to step S705 and returns an error indicating that the service is already started and Shop name 603 to the MFP 101 (S705). Here, in the case where icon information or the like that represents the shop exists other than Shop name 603, the management server 102 also returns the icon information or the like at the same time. Upon receipt of the error indicating that the service is already started, the MFP 101 displays a UI 830 that uses Shop name 603 shown in FIG. 8C. Here, in the case where icon information or the like that represents the shop exists other than Shop name 603, it is also possible for the MFP 101 to display the icon information or the like.

In the case where Status 605 is not "service already started" (NO at S704), the management server 102 advances the processing to step S706. At step S706, the management server 102 returns information to check the start of the service and Shop name 603 to the MFP 101. Here, in the case where icon information or the like that represents the shop exists other than Shop name 603, the management server 102 also returns the icon information or the like at the same time. Upon receipt of the information to check the start of the service, the MFP 101 displays the UI 840 that uses Shop name 603 shown in FIG. 8D. In the case where icon information or the like that represents the shop exists other than Shop name 603, it is also possible for the MFP 101 to display the icon information or the like at the same time. Further, in the case where an OK button 841 on the UI 840 is pressed down by the user, the MFP 101 transmits a service start request to the management server 102.

Figure 8E:
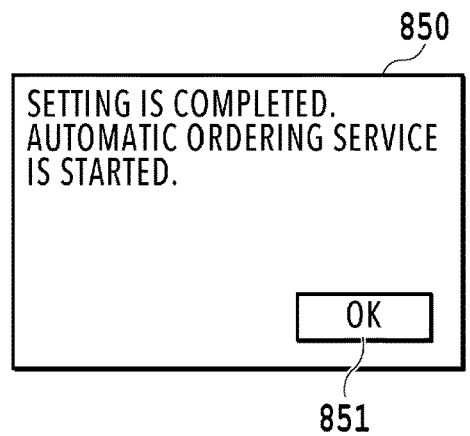

At step S707, the management server 102 receives a service start request from the MFP 101. Upon receipt of a service start request from the MFP 101, the management server 102 updates Status 605 associated with Apparatus identification information 601 to "service already started" in the database 313 (S708). After updating the database 313, the management server 102 advances the processing to step S709 and transmits information indicating that registration of the MFP 101 is completed (S709). Upon receipt of the information indicating that registration is completed, the MFP 101 displays a UI 850 shown in FIG. 8E. Further, the MFP 101 stores an already registered flag in the program memory 206.

In the present embodiment, performing the registration processing by using the display unit 208 of the MFP 101 is shown, but it is also possible to perform the registration processing from a PC or a smartphone by using the apparatus identification information on the MFP 101. Further, in the case where the registration processing shown in FIG. 7 is completed, it is made possible for a user to make use of the consumable item ordering service from the MFP 101.

Figure 9B:
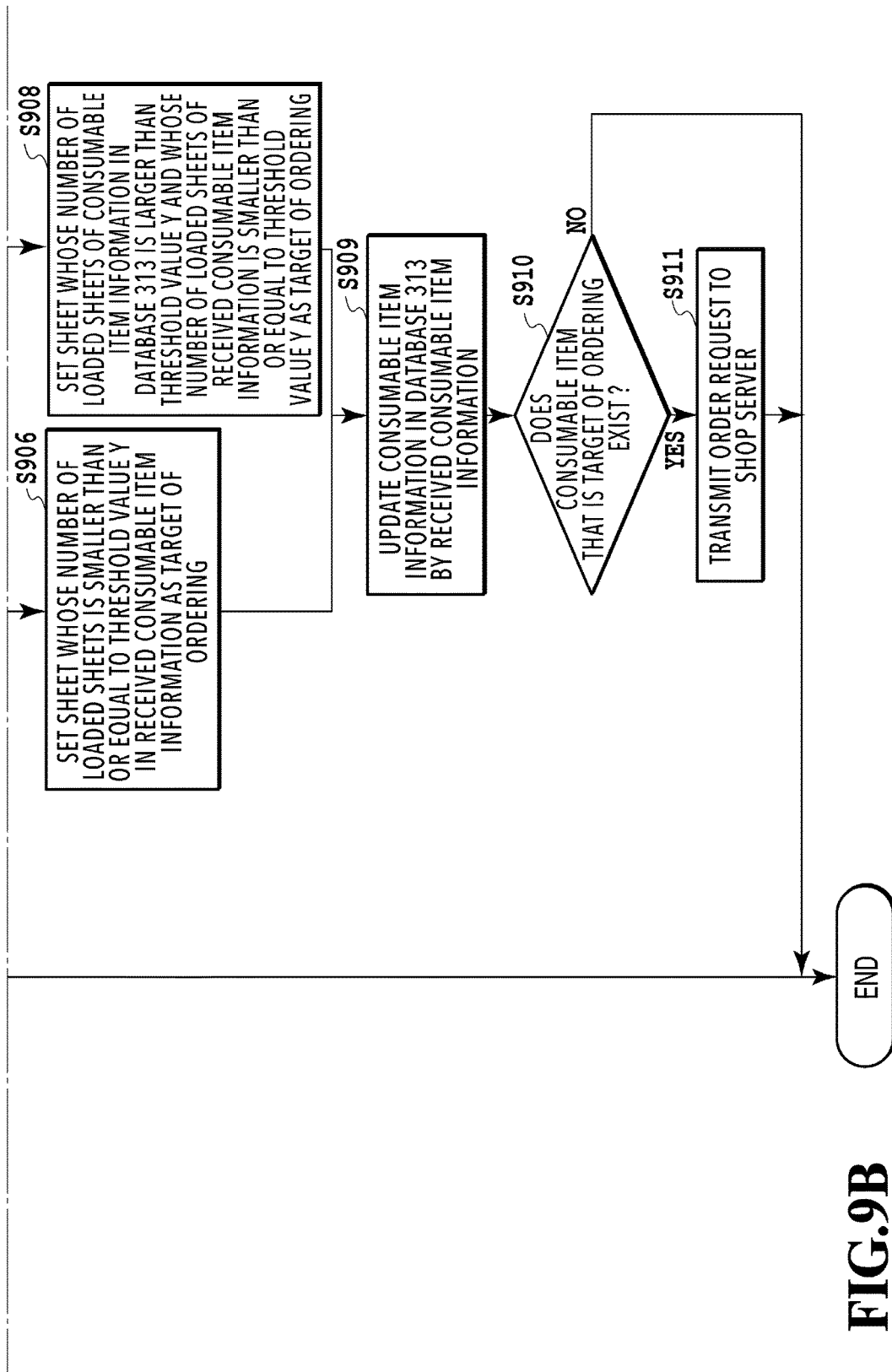
FIG. 9B is a flowchart showing a flow of consumable item ordering processing.

Next, consumable item ordering processing in the management server 102 is explained. FIG. 9A and FIG. 9B are flowcharts showing a flow of the consumable item ordering processing in the management server 102. After storing the information indicating that registration to the consumable item ordering system has already been completed in the program memory 206 as an already registered flag, the MFP 101 notifies the management server 102 of consumable item information. Here, it is possible for the MFP 101 to notify the management server 102 of the consumable item information at predetermined time intervals, in the case where the consumable item information changes, or immediately after the print processing or the scan processing.

At step S901, the management server 102 receives apparatus identification information and consumable item information from the MFP 101. FIG. 10 shows an example of the consumable item information. As shown in FIG. 10, the consumable item information includes the color, the remaining amount, and the status of each ink, the size and the type of the sheet, the number of loaded sheets, and so on. At step S902, the management server 102 determines whether or not the shop identification information associated with the received apparatus identification information exists in the database 313 and Status 605 thereof is "service already started".

In the case where the shop identification information associated with the received apparatus identification information does not exist in the database 313, or in the case where the shop identification information exists in the database 313 but Status 605 thereof is not "service already started", the management server 102 advances the processing to step S903. At step S903, the management server 102 returns an error indicating that the service cannot be started to the MFP 101. Upon receipt of the error indicating that the service cannot be started, the MFP 101 deletes the already registered flag of the consumable item ordering system, which is stored in the program memory 206. Then, after this, the MFP 101 no longer notifies the management server 102 of the consumable item information.

In the case where the shop identification information associated with the received apparatus identification information exists in the database 313 and Status 605 thereof is "service already started", the management server 102 advances the processing to step S904. At step S904, the management server 102 determines whether or not the received consumable item information exists in the database 313. In the case where the consumable item information does not exist in the database 313 (NO at S904), the management server 102 advances the processing to step S905 and in the case where the consumable item information exists (YES at S904), the management server 102 advances the processing to step S907.

At step S905, the management server 102 determines whether or not an ink tank whose ink remaining amount is smaller than or equal to a threshold value X (that is, smaller than or equal to a predetermined threshold value) exists in the consumable item information received at step S901, and in the case where the ink tank such as this exists, the ink tank is set as the target of ordering. Next, at step S906, the management server 102 determines whether or not a sheet whose number of loaded sheets is smaller than or equal to a threshold value Y exists in the consumable item information received at step S901, and in the case where the sheet such as this exists, the sheet is set as the target of ordering.

After this, the management server 102 stores (updates) the consumable item information received at step S901 in the database (S909) and determines whether or not a consumable item that is the target of ordering exists (S910). In the case where a consumable item that is the target of ordering exists (YES at S910), the management server 102 advances the processing to step S911 and transmits an order request to the shop server 103 (S911). Specifically, the management server 102 makes an order request for a consumable item by Ordering URL 604 stored in the database 313.

Further, in the case of determining that the received consumable item information exists in the database 313, the management server 102 sets the ink tank as the target of ordering, whose ink remaining amount of the consumable item information in the database 313 is larger than the threshold value X and whose ink remaining amount of the received consumable item information is smaller than or equal to the threshold value X (S907). Next, at step S908, the management server 102 sets the sheet as the target of ordering, whose number of loaded sheets of the consumable item information in the database 313 is larger than the threshold value Y and whose number of loaded sheets of the received consumable item information is smaller than or equal to the threshold value Y. As described above, by using the difference between the consumable item information received from the MFP 101 in the consumable item ordering processing of the previous time (that is, the consumable item information in the database 313) and the consumable item information received from the MFP 101 in the consumable item ordering processing of this time, a double order is prevented.

After this, the management server 102 stores (updates) the consumable item information received at step S901 in the database (S909) and determines whether or not a consumable item that is the target of ordering exists (S910). In the case where a consumable item that is the target of ordering exists (YES at S910), the management server 102 advances the processing to step S911 and transmits an order request to the shop server 103 (S911).

Figure 11:
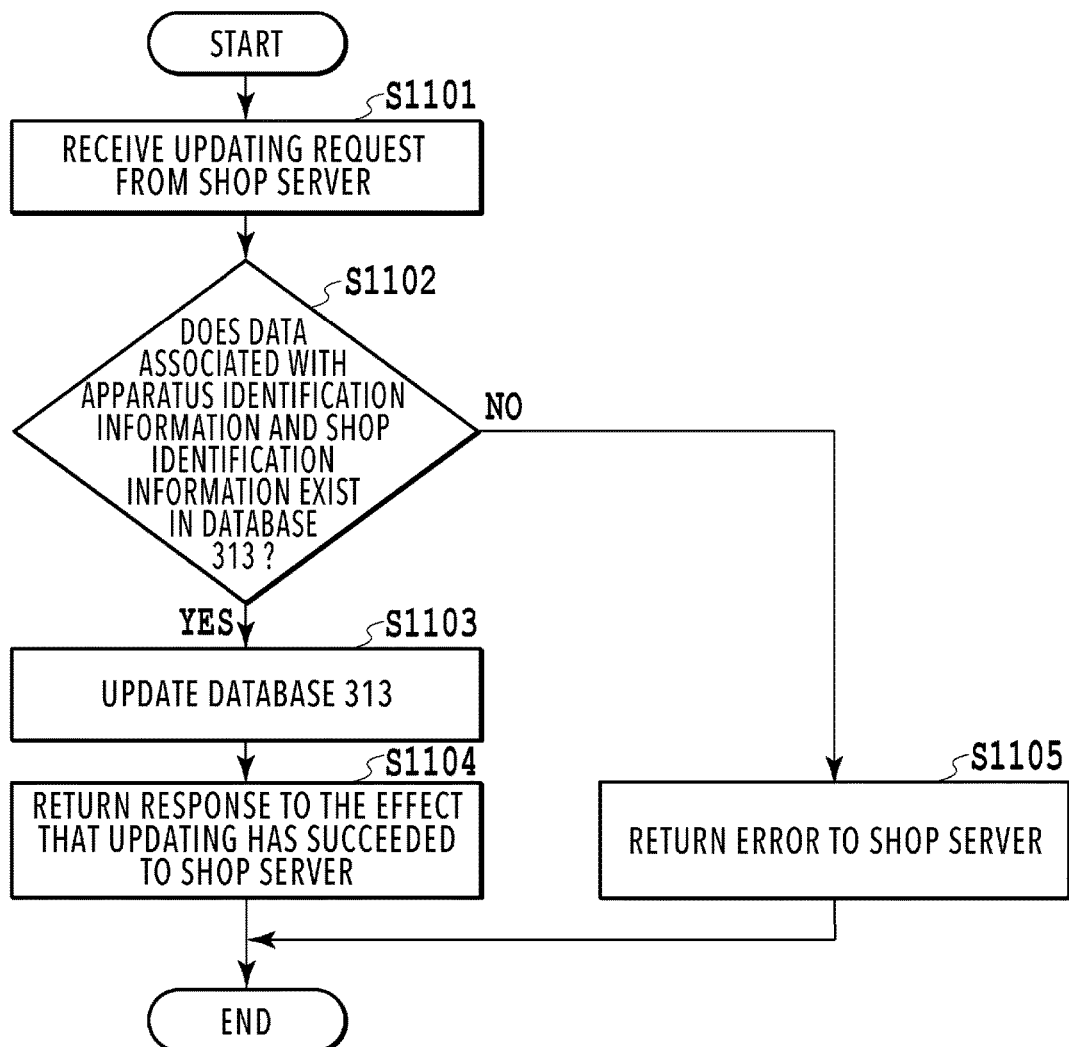
FIG. 11 is a flowchart showing a flow of updating processing of shop information.

Next, by using FIG. 11, updating processing of shop information is explained. FIG. 11 is a flowchart showing a flow of the updating processing of the shop information of the management server 102. There is a case where a shop desires to change the information on the shop, for example, such as the shop name and the ordering URL. In such a case, the shop transmits a shop information updating request to the management server 102 from the shop server 103.

The management server 102 receives an updating request from the shop server 103 (S1101). To the updating request that is received at this step S1101, the apparatus identification information, the shop identification information, and the shop information that is the target of updating, such as the shop name and the ordering URL, are attached. The management server 102 determines whether or not the received apparatus identification information and shop identification information exist in the database 313 (S1102). In the case where the received apparatus identification information and shop identification information do not exist in the database 313, the management server 102 advances the processing to step S1105 and transmits an error to the shop server 103 (S1105). In the case where the received apparatus identification information and shop identification information exist in the database 313, the management server 102 advances the processing to step S1103. The management server 102 updates the database 313 by the shop information received at step S1101 (S1103), and further, returns information indicating that the updating of the shop information has succeeded to the shop server 103 (S1104).

Figure 12:
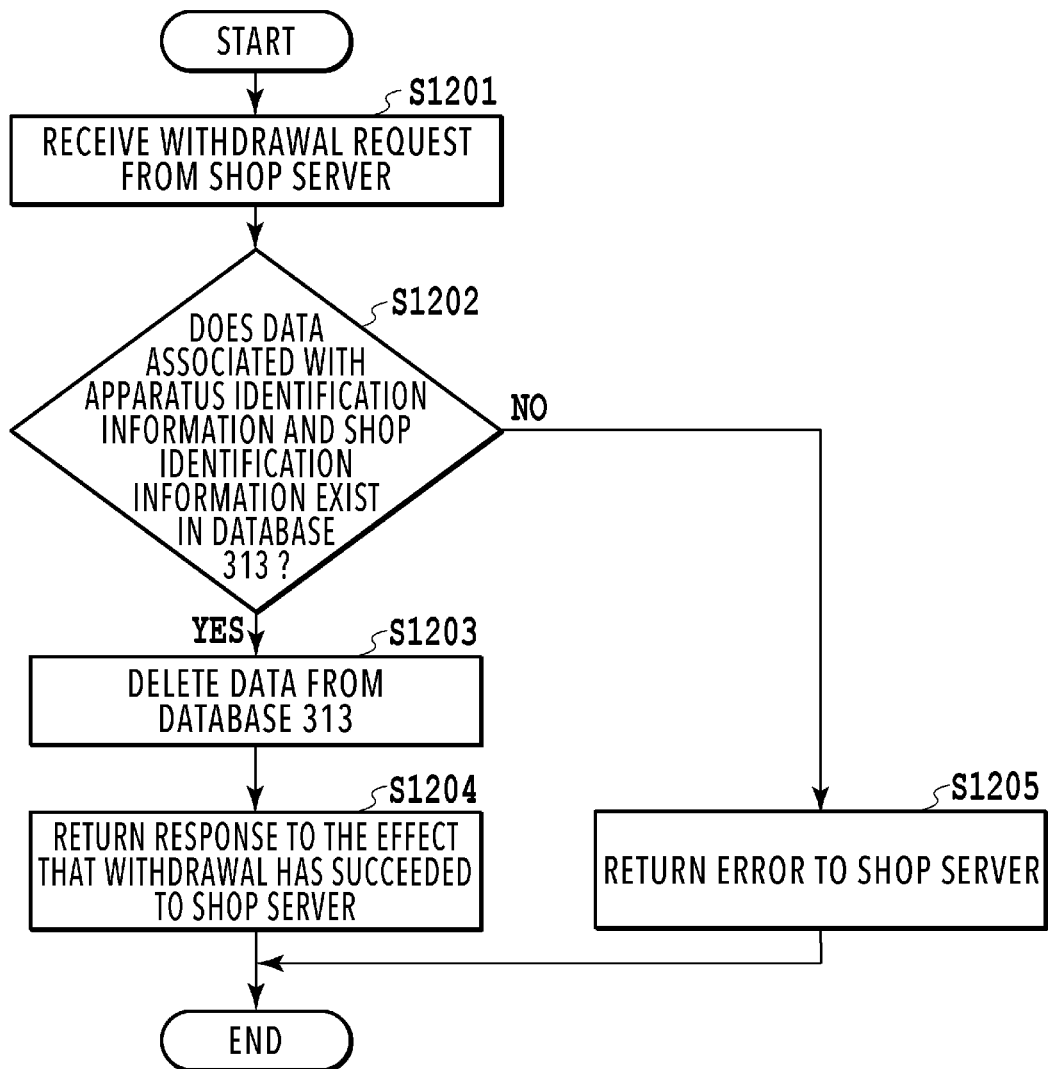
FIG. 12 is a flowchart showing a flow of withdrawal processing.

Finally, withdrawal processing in the management server 102 is explained. FIG. 12 is a flowchart showing a flow of the withdrawal processing of the management server 102. It is possible for a user to perform a withdrawal procedure from the consumable item ordering service for the shop at which the user has entered the consumable item ordering service. It is also possible to perform the withdrawal procedure at a branch of the shop or online.

Here, in the case where the withdrawal procedure is performed at a branch of the shop, a user submits a withdrawal procedure (that is, a withdrawal notification) to the branch of the shop. Then, upon acceptance of the withdrawal procedure from the user, the shop inputs data in relation to the withdrawal to the shop server 103. In the case of performing the withdrawal procedure online, a user accesses the Web site of the shop from a PC, a smartphone, and so on, and performs the withdrawal procedure on the Web site (online). Then, after the withdrawal procedure is performed, the shop server 103 transmits a withdrawal request to the management server 102.

The management server 102 receives the withdrawal request transmitted from the shop server 103 (S1201). The withdrawal request is received in association with Apparatus identification information 601 and Shop identification information 602. Upon receipt of Apparatus identification information 601 and Shop identification information 602, the management server 102 determines whether or not data associated with the information exists in the database 313 (S1202). In the case where data associated with Apparatus identification information 601 and Shop identification information 602 that are received does not exist in the database 313, the management server 102 advances the processing to step S1205 and transmits an error to the shop server 103 (S1205).

Further, in the case where data associated with Apparatus identification information 601 and Shop identification information 602 that are received exists in the database 313, the management server 102 advances the processing to step S1203. The management server 102 deletes the data associated with Apparatus identification information 601 and Shop identification information 602 that are received at step S1201 from the database 313 (S1203) and further, returns information indicating that the withdrawal processing is completed to the shop server 103 (S1204).

Also in the case where a shop cancels the consumable item ordering service for the reason of the shop, such as the bankruptcy of the shop, the management server 102 performs the withdrawal processing shown in FIG. 12 upon receipt of the withdrawal request from the shop server 103. Further, after the withdrawal processing of the management server 102 is completed, even in the case where the MFP 101 notifies the management server 102 of consumable item information, the management server 102 determines that the shop identification information associated with the apparatus identification information does not exists at step S902 in FIG. 9A and advances the processing to step S903. That is, the management server 102 returns a service start error to the MFP 101 (S903). In addition, upon receipt of the service start error, the MFP 101 deletes the already registered flag of the consumable item ordering service, which is stored in the program memory 206. Then, after this, the MFP 101 no longer notifies the management server 102 of consumable item information.

As above, it is possible for a user to easily perform the procedure in relation to admission to and withdrawal from the consumable item ordering service. Further, in the case where a user desires to change the shop with which an order is made, the user first performs the withdrawal procedure for the shop at which the user has performed the admission procedure to the consumable item ordering service. Next, the user performs the admission procedure to the consumable item ordering service for a new shop. Further, the user completes the registration processing by pressing down the registration button 811 to register in the consumable item ordering service. Due to this, it is possible to change the consumable item order service to that whose order destination is the new shop. In addition, also in the case where a shop compatible with the consumable item ordering service is added or deleted, it is sufficient only to perform maintenance of the database 313 without the need to update the firmware of the MFP 101 or the application of the management server 102.

In the above-described embodiments, the management server 102 includes one information processing apparatus, but the present invention is not limited to this. The management server 102 may include a plurality of information processing apparatuses. That is, the function of the management server 102 may be implemented by a plurality of information processing apparatuses performing distributed processing.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to set an order destination without the need to cause a consumable item to have information on the order destination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-029402, filed Feb. 20, 2017, which is hereby incorporated by reference wherein in its entirety.

What is claimed is:

1. A server system comprising one or more processors operating to:
    acquire first identification information for identifying an image processing apparatus and second identification information for identifying a source of purchase of a consumable item used by the image processing apparatus, which are transmitted from an external apparatus associated with the source of purchase that is different from the image processing apparatus;
    store, in a storage medium, the acquired first identification information and the acquired second identification information transmitted from the external apparatus, wherein the stored first identification information and the stored second identification information are associated with each other;
    receive first identification information for identifying an image processing apparatus, transmitted from the image processing apparatus;
    determine, based on the received first identification information transmitted from the image processing apparatus, whether the storage medium already contains stored first identification information that is associated with stored second identification information for identifying the source of purchase and has been transmitted from the external apparatus that is associated with the source of purchase and is different from the image processing apparatus, and that corresponds to the received first identification information transmitted from the image processing apparatus; and
    start a predetermined service to make an order for the consumable item with the source of purchase in a case where it is determined that the storage medium already contains stored first identification information that is associated with the second identification information for identifying the source of purchase and that corresponds to the received first identification information transmitted from the image processing apparatus has been stored in the storage medium.

2. The server system according to claim 1, wherein the one or more processors further operate to:
    acquire information on the consumable item, which is transmitted from the image processing apparatus;
    determine whether to make an order for the consumable item with the source of purchase based on the acquired consumable item information transmitted from the image processing apparatus in a case where the predetermined service has started; and
    request to make an order for the consumable item with the source of purchase in a case where it is determined that an order for the consumable item is made.

3. The server system according to claim 1, wherein an association between the stored first identification information and the stored second identification information can be updated.

4. The server system according to claim 2, wherein the one or more processors further operate to:
    determine to make an order for the consumable item with the source of purchase in a case where a remaining amount value of the acquired consumable item information is smaller than a predetermined threshold value.

5. The server system according to claim 2, wherein
the one or more processors further operate to:
  determine to make an order for the consumable item with the source of purchase in a case where a remaining amount value of the acquired consumable item information is smaller than a predetermined threshold value and a remaining amount value of the consumable item information acquired the previous time is larger than the predetermined threshold value.

6. The server according to claim 1, wherein
the one or more processors further operate to:
  receive an admission request with at least the first identification information and the second identification information transmitted from the image processing apparatus, the source of purchase being a dealer for whom an admission procedure has been performed by a user.

7. The server system according to claim 1, wherein
the one or more processors further operate to:
  receive a registration request with the first identification information transmitted from the image processing apparatus;
  transmit, as a response to the registration request, information relating to the source of purchase to the image processing apparatus;
  receive a request to start the predetermined service;
  store status information indicating the predetermined service has been started in the storage medium in a case where the request to start the predetermined service is received,
  wherein determination processing whether to make an order for the consumable item is executable in a case where the status information indicating the predetermined service has been started is stored.

8. The server system according to claim 2, wherein
the one or more processors further operate to:
  transmit a transmission stop command of the consumable item information to the image processing apparatus in a case where it is determined that the second identification information associated with the first identification information does not exist in the storage medium.

9. The server system according to claim 1, wherein
the one or more processors further operate to:
  receive an updating request associated with the stored first identification information and the stored second identification information, the updating request including updating information on the source of purchase; and
  update information stored in the storage medium based on the received updating information.

10. The server system according to claim 1, wherein
the one or more processors further operate to:
  receive a withdrawal request associated with the stored first identification information and the stored second identification information; and
  delete the first identification information and the second identification information that are stored in the storage medium based on the withdrawal request.

11. An image processing apparatus that transmits consumable item information to a server system, wherein the server system acquires first identification information for identifying an image processing apparatus and second identification information for identifying a source of purchase of a consumable item used by the image processing apparatus that are transmitted from an external apparatus associated with the source of purchase that is different from the image processing apparatus, and the server system stores the acquired first identification information and the acquired second identification information in a storage medium of the server system so as to be associated with each other, the image processing apparatus comprising one or more processors operating to:
  receive instructions to start a predetermined service to make an order for the consumable item from a user;
  transmit first identification information for identifying the image processing apparatus to the server system in response to the instructions; and
  receive in a case where the server system determines, based on the transmitted first identification information transmitted by the image processing apparatus, that the storage medium of the server system already contains stored first identification information that is associated with stored second identification information for identifying the source of purchase and has been transmitted from the external apparatus that is associated with the source of purchase and is different from the image processing apparatus, and that corresponds to the received first identification information transmitted from the image processing apparatus, a notification in relation to the start of a predetermined service to make an order for the consumable item with the source of purchase, which is transmitted from the server system.

12. The image processing apparatus according to claim 11, wherein
the one or more processors further operate to:
  transmit the consumable item information to the server system.

13. The image processing apparatus according to claim 11, wherein
the one or more processors further operate to:
  transmit an admission request associated with at least the first identification information and the second identification information to the server system, the source of purchase being a dealer for whom an admission procedure has been performed by a user.

14. The image processing apparatus according to claim 11, wherein
the one or more processors further operate to:
  transmit a registration request with the first identification information to the server system;
  receive, as a response to the registration request, information relating to the source of purchase that is transmitted from the server system; and
  transmit a request to start the predetermined service to the server system.

15. The image processing apparatus according to claim 12, wherein
in a case where a transmission stop command of the consumable item information is received, transmission of the consumable item information to the server system is stopped.

16. A system comprising an image processing apparatus and one or more first processors as a server system, wherein
the one or more first processors operating to:
  acquire first identification information for identifying an image processing apparatus and second identification information for identifying a source of purchase of a consumable item used by the image processing apparatus, which are transmitted from an external apparatus associated with the source of purchase that is different from the image processing apparatus;

store, in a storage medium, the acquired first identification information and the acquired second identification information transmitted from the external apparatus, wherein the stored first identification information and the stored second identification information are associated with each other;

receive first identification information for identifying an image processing apparatus, transmitted from the image processing apparatus;

determine, based on the received first identification information transmitted from the image processing apparatus, whether the storage medium already contains stored first identification information that is associated with stored second identification information for identifying the source of purchase and has been transmitted from the external apparatus that is associated with the source of purchase and is different from the image processing apparatus, and that corresponds to the received first identification information transmitted from the image processing apparatus; and start a predetermined service to make an order for the consumable item with the source of purchase in a case where it is determined that the storage medium already contains stored first identification information that is associated with the second identification information for identifying the source of purchase and that corresponds to the received first identification information transmitted from the image processing apparatus has been stored in the storage medium, and the image processing apparatus comprising one or more second processors operating to:

receive instructions to start a predetermined service to make an order for the consumable item from a user;

transmit first identification information for identifying the image processing apparatus to the server system in response to the instructions; and receive in a case where the server system determines, based on the transmitted first identification information transmitted by the image processing apparatus, that the storage medium of the server system already contains stored first identification information that is associated with stored second identification information for identifying the source of purchase and has been transmitted from the external apparatus that is associated with the source of purchase and is different from the image processing apparatus, and that corresponds to the received first identification information transmitted from the image processing apparatus, a notification in relation to the start of a predetermined service to make an order for the consumable item with the source of purchase, which is transmitted from the server system.

17. The system according to claim 16, wherein the one or more first processors further operate to:
acquire information on the consumable item, which is transmitted from the image processing apparatus;
determine whether to make an order for the consumable item with the source of purchase based on the acquired consumable item information transmitted from the image processing apparatus in a case where the predetermined service has started; and
request to make an order for the consumable item with the source of purchase in a case where it is determined that an order for the consumable item is made, and
the one or more second processors further operate to:
transmit the consumable item information to the one or more first processors.

18. The system according to claim 16, wherein the one or more first processors further operate to:
update an association between the first identification information and the second identification information.

19. The system according to claim 17, wherein the one or more first processors further operate to:
determine to make an order for the consumable item with the source of purchase in a case where a remaining amount value of the acquired consumable item information is smaller than a predetermined threshold value.

20. The system according to claim 17, wherein the one or more first processors further operate to:
determine to make an order for the consumable item with the source of purchase in a case where a remaining amount value of the acquired consumable item information is smaller than a predetermined threshold value and a remaining amount value of the consumable item information acquired the previous time is larger than the predetermined threshold value.

21. The system according to claim 16, wherein the one or more first processors further operate to:
receive an admission request with at least the first identification information and the second identification information, the source of purchase being a dealer for whom an admission procedure has been performed by a user.

22. The system according to claim 16, wherein the one or more first processors further operate to:
receive a registration request with the first identification information;
transmit, as a response to the registration request, information relating to the source of purchase to the image processing apparatus;
receive a request to start the predetermined service;
store status information indicating the predetermined service has been started in the storage medium in a case where the request to start the predetermined service is received, wherein determination processing whether to make an order for the consumable item is executable in a case where the status information indicating the predetermined service has been started is stored,
the one or more second processors further operate to:
transmit a registration request with the first identification information to the server system;
receive, as a response to the registration request, information relating to the source of purchase that is transmitted from the server system; and
transmit a request to start the predetermined service to the server system.

23. The system according to claim 17, wherein the one or more first processors further operate to:
transmit a transmission stop command of the consumable item information to the image processing apparatus in a case where it is determined that the second identification information associated with the first identification information does not exist in the storage medium.

24. The system according to claim 16, wherein the one or more first processors further operate to:
receive an updating request associated with the first identification information and the second identification information, the updating request including updating information on the source of purchase; and update information stored in the storage medium based on the received updating information.

25. The system according to claim 16, wherein the one or more first processors further operate to:
   receive a withdrawal request associated with the first identification information and the second identification information; and
   delete the first identification information and the second identification information that are received in the storage medium based on the withdrawal request.

* * * * *